(12) United States Patent
Luo et al.

(10) Patent No.: US 8,354,485 B2
(45) Date of Patent: Jan. 15, 2013

(54) ALUMINOXANE CATALYST ACTIVATORS DERIVED FROM DIALKYLALUMINUM CATION PRECURSOR AGENTS, PROCESSES FOR MAKING SAME, AND USE THEREOF IN CATALYSTS AND POLYMERIZATION OF OLEFINS

(75) Inventors: Lubin Luo, Baton Rouge, LA (US); Samuel A. Sangokoya, Baton Rouge, LA (US); Xiao Wu, Baton Rouge, LA (US); Steven P. Diefenbach, Baton Rouge, LA (US); Brian Kneale, Naperville, IL (US)

(73) Assignee: Albemarle Corporation, Baton Rouge, LA (US)

( * ) Notice: Subject to any disclaimer, the term of this patent is extended or adjusted under 35 U.S.C. 154(b) by 700 days.

(21) Appl. No.: 12/201,985

(22) Filed: Aug. 29, 2008

(65) Prior Publication Data

US 2009/0062492 A1  Mar. 5, 2009

Related U.S. Application Data

(60) Provisional application No. 60/968,810, filed on Aug. 29, 2007.

(51) Int. Cl.
*C08F 4/02* (2006.01)
*C08F 4/642* (2006.01)
*C08F 4/6592* (2006.01)
*B01J 31/22* (2006.01)

(52) U.S. Cl. ........ 526/165; 556/173; 556/178; 556/179; 556/182; 556/186; 502/103; 502/120; 502/132; 526/160; 526/943

(58) Field of Classification Search .............. 556/173, 556/180, 186, 178, 179, 182; 502/103, 120, 502/132; 526/160, 165, 943
See application file for complete search history.

(56) References Cited

U.S. PATENT DOCUMENTS

| | | |
|---|---|---|
| 4,808,561 A | 2/1989 | Welborn, Jr. |
| 4,912,075 A | 3/1990 | Chang |
| 5,032,652 A | 7/1991 | Chang |
| 5,329,032 A | 7/1994 | Tran |
| 5,369,196 A | 11/1994 | Matsumoto et al. |
| 5,561,092 A | 10/1996 | Ewen et al. |
| 5,869,417 A | 2/1999 | Woo et al. |
| 5,985,784 A | 11/1999 | Winter et al. |
| 6,063,726 A | 5/2000 | Kioka |
| 2003/0195307 A1 | 10/2003 | Kaji |
| 2003/0207757 A1 | 11/2003 | Hong |
| 2005/0143254 A1 | 6/2005 | Sangokoya et al. |

FOREIGN PATENT DOCUMENTS

| | | |
|---|---|---|
| EP | 0 367 503 A1 | 5/1990 |
| EP | 0 553 757 A1 | 8/1993 |
| EP | 0 619 326 A1 | 10/1994 |
| WO | WO 99/20660 A1 | 4/1999 |
| WO | 2007005676 | 1/2007 |
| WO | WO 2007/005364 A2 | 1/2007 |
| WO | WO 2007/076398 A2 | 7/2007 |

OTHER PUBLICATIONS

Qi Wang, et al; "Ethyl-iso-butylaluminoxane Activated Metallocene Catalyst for Olefin Polymerization", Journal of Polymer Science: Part A: Polymer Chemistry; 2003; pp. 998-1003; vol. 41; Wiley Periodicals, Inc.; Wilmington, Delaware.
Christine E. Denner, et al; "Increase of Catalyst Activity by Transfer of Bulky Alkyl Groups From Zirconocene Complexes to Methylalumoxane"; Journal of Applied Polymer Science; 2003; pp. 1336-1340; vol. 89; Wiley Periodicals, Inc.; Wilmington, Delaware.
Henri Cramail; "Routes to Reduce Aluminium Co-Catalyst Content for Zirconocene Activation in Olefin Polymerization"; Macromolecular Symposia; 2002; pp. 113-119; vol. 183; Wiley-VCH Verlag GmbH & Co. KGaA; Weinheim, Germany.

*Primary Examiner* — Caixia Lu
(74) *Attorney, Agent, or Firm* — James A. Jubinsky (57) ABSTRACT

Compositions useful for activating catalysts for olefin polymerization, and methods for making same, are provided. Such compositions can be derived from at least: an organoaluminum compound, a carrier, an oxygen source, and, optionally, a Lewis base.

31 Claims, 4 Drawing Sheets

Figure 3

ALUMINOXANE CATALYST ACTIVATORS DERIVED FROM DIALKYLALUMINUM CATION PRECURSOR AGENTS, PROCESSES FOR MAKING SAME, AND USE THEREOF IN CATALYSTS AND POLYMERIZATION OF OLEFINS

Partially hydrolyzed aluminum alkyl compounds known as aluminoxanes (AO) are used for activating transition metals for olefin polymerization activity. One such compound, methylaluminoxane (MAO), is a frequently chosen aluminum co-catalyst/activator in the industry. Considerable effort has been devoted to improving the effectiveness of catalyst systems based on use of aluminoxanes or modified aluminoxanes for polymerization of olefins. Representative patents and publications in the field of aluminoxane usage include the following: U.S. Pat. No. 5,324,800 to Welborn et al.; U.S. Pat. No. 4,752,597 to Turner; U.S. Pat. Nos. 4,960,878 and 5,041,584 to Crapo et al.; WO 96102580 to Dall'occo, et al.; EP 0 277 003 and EP 0 277 004 to Turner; Hlatky, Turner, and Eckman, *J. Am. Chem. Soc.,* 1989, 111, 2728-2729; Hlatky and Upton, Macromolecules, 1996, 29, 8019-8020. U.S. Pat. No. 5,153,157 to Hlatky and Turner; U.S. Pat. No. 5,198,401 to Turner, Hlatky, and Eckman; Brintzinger, et al., *Angew. Chem. Int. Ed. Engl.,* 1995, 34, 1143-1170; and the like. Despite technological advances, many aluminoxane-based polymerization catalyst activators still lack the activation efficiencies needed for commercial applicability, require commercially unacceptably high aluminum loading, are expensive (especially MAO), and have other impediments to commercial implementation.

WO 2003/082879 and WO 2007/005400 (Sangokoya et al) describe ionic aluminoxanate compositions and methods of preparation. Ionic aluminoxanate compositions are formed by contact of regular non-ionic MAO with monodentate or bidentate Lewis base ligands like octamethyltrisiloxane (OMTS). The cation of the ionic aluminoxanate comprises a dimethylaluminium cation stabilized by the chelating bidentate Lewis base ligand OMTS. While these ionic aluminoxanate compositions are effective activators in polyolefin catalysis, the preparation of these compositions leads to two-phase clathrate mixtures requiring tedious work-up procedures for isolation.

Other aspects of Lewis base stabilized dialkylaluminium cations and their activation characteristics are described in Klosin et al WO 2000/011006 and *Organometallics,* 19 (2000)4684-4686.

Babushkin and Brintzinger (J. Am. Chem. Soc. 124 (2002) 12869-12873) and Sarzotti et al (J. Polymer Sci: Part A, Polymer Chemistry, pp 1677-1690 published online on Mar. 15, 2007) describe MAO activation of a zirconocene catalyst precursor and relate the importance of dimeric metallocene dialkylaluminum cation, for example, $[Cp_2Zr(\mu-Me)_2AlMe_2]^+$, to catalyst efficiency. Maximizing these types of dimeric cations by providing high Al to Zr mole ratios requires undesirably large amounts of MAO.

Thus, a need exists for MAO type compositions that exhibit higher efficiencies for activating transition metals for olefin polymerization over conventional MAO. Additionally, a need also exists for such compositions that are not derived from isolated MAO.

This invention meets the above-described needs by providing compositions derived from at least: a) an intermediate composition derived from at least an organoaluminum compound, a carrier, and an oxygen source; and b) $R^2{}_2AlY$, wherein each $R^2$ independently comprises a hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical. The carrier can comprise an inorganic oxide. The inorganic oxide can have a pore volume of not less than about 0.3 ml/g and an average particle diameter of about 10 micrometers to about 500 micrometers. The inorganic oxide can comprise silica, alumina, silica-alumina, magnesia, titania, zirconia, or clays. The organoaluminum compound can comprise trimethylaluminum, triethylaluminum, or triisobutylaluminum. The $R^2{}_2AlY$ can comprise dimethylaluminum halide, dialkylaluminum fluoride, or dimethylaluminum fluoride. Compositions of this invention are suitable for activating a transition metal component. Compositions of this invention can be further derived from a Lewis base. Compositions of this invention can be derived from at least: a) an intermediate composition derived from at least an organoaluminum compound, a carrier, and an oxygen source; b) $R^2{}_2AlY$, wherein each $R^2$ independently comprises a hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical; and c) a Lewis base. According to this invention, catalyst compositions for olefin polymerization can be prepared by combining at least compositions of this invention and a transition metal component.

Compositions of this invention can be derived from at least: a) an intermediate composition derived from at least a carrier and an oxygenated organoaluminum compound; and b) $R^2{}_2AlY$, wherein each $R^2$ independently comprises a hydrocarbyl group having from 1 to about 20 carbon atoms, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical. Such compositions can be further derived from a Lewis base.

According to this invention, methods of preparing a composition comprise: a) combining at least an organoaluminum compound, a carrier, and an oxygen source to form an intermediate composition; and b) combining at least a portion of the intermediate composition with $R^2{}_2AlY$, wherein each $R^2$ independently comprises a hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical. Also provided are methods of preparing a composition comprising combining at least: a) an intermediate composition derived from at least an organoaluminum compound, a carrier, and an oxygen source; and b) $R^2{}_2AlY$, wherein each $R^2$ independently comprises a hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical. Also provided are methods of preparing a composition comprising combining at least: a) an intermediate composition derived from at least an organoaluminum compound, a carrier, and an oxygen source; b) $R^2{}_2AlY$, wherein each $R^2$ independently comprises a hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical; and c) a Lewis base. Also provided are methods of preparing a composition comprising combining at least: a) an intermediate composition derived from at least a carrier and an oxygenated organoaluminum compound; and b) $R^2{}_2AlY$, wherein each $R^2$ independently comprises hydrocarbyl group having from 1 to about 20 carbon atoms, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical. Also provided are methods of preparing a composition comprising combining at least: a) an intermediate composition derived from at least a carrier and an oxygenated organoaluminum compound; b) $R^2{}_2AlY$, wherein each $R^2$ independently comprises hydrocarbyl group having from 1 to about 20 carbon atoms, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical; and c) Lewis base. Also provided are methods of preparing a catalyst for olefin polymerization, comprising combining at least (a) a transition metal, (b) an intermediate composition derived from at least an organoaluminum compound, a carrier, and an oxygen source, and (c) $R^2{}_2AlY$, wherein each $R^2$ independently comprises hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical. Also provided are methods of preparing a catalyst for olefin polymerization, comprising combining at least (a) a transition metal, (b) an intermediate composition derived from at least a carrier and an oxygenated organoaluminum compound, and (c) $R^2{}_2AlY$, wherein each $R^2$ independently comprises hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical.

This invention also provides methods of polymerizing monomer comprising carrying out such polymerization in the presence of one or more catalyst composition according to this invention. Also provided are methods of polymerizing monomer comprising combining a composition according to this invention, a transition metal component, and monomer.

This invention also provides compositions derived from at least: a) an intermediate composition derived from at least an organoaluminum compound and an oxygen source; and b) $R^2{}_2AlY$, wherein each $R^2$ independently comprises hydrocarbyl group having from 1 to about 20 carbons, and Y consists essentially of an alkoxide radical, an aryloxide radical, an alkyl substituted amide radical, an aryl substituted amide radical, a siloxy radical, a boronoxy radical, or a diaryl boronoxy radical. Also provided are compositions derived from at least: a) an intermediate composition derived from at least an organoaluminum compound and an oxygen source; b) $R^2{}_2AlY$, wherein each $R^2$ independently comprises hydrocarbyl group having from 1 to about 20 carbons, and Y consists essentially of an alkoxide radical, an aryloxide radical, an alkyl substituted amide radical, an aryl substituted amide radical, a siloxy radical, a boronoxy radical, or a diaryl boronoxy radical; and c) a Lewis base.

This invention also provides methods of preparing a composition comprising combining at least: a) an intermediate composition derived from at least an organoaluminum compound and an oxygen source; and b) $R^2{}_2AlY$, wherein each $R^2$ independently comprises hydrocarbyl group having from 1 to about 20 carbons, and Y consists essentially of an alkoxide radical, an aryloxide radical, an alkyl substituted amide radical, an aryl substituted amide radical, a siloxy radical, a boronoxy radical, or a diaryl boronoxy radical. Also provided are methods of preparing a composition comprising combining at least: a) an intermediate composition derived from at least an organoaluminum compound and an oxygen source; b) $R^2{}_2AlY$, wherein each $R^2$ independently comprises hydrocarbyl group having from 1 to about 20 carbons, and Y consists essentially of an alkoxide radical, an aryloxide radical, an alkyl substituted amide radical, an aryl substituted amide radical, a siloxy radical, a boronoxy radical, or a diaryl boronoxy radical; and c) a Lewis base.

We have recognized that formation of cations of ionic aluminoxanate compositions as described in WO 2003/082879 and WO 2007/005400 (Sangokoya et al) result from contact of a chelating Lewis base with what we have termed a "dialkylaluminum cation precursor" moiety contained within the MAO structural framework. We have also discovered how to increase the quantity of such dialkylaluminum cation precursors in aluminoxanes, such as MAO, by use of what we have termed "dialkylaluminum cation precursor agents", and that increasing the quantity of dialkylaluminum cation precursors substantially improves catalytic performance of aluminoxanes.

For purposes of describing this invention, the term "dialkylaluminum cation precursor" means a moiety contained within the MAO structural framework that can react with Lewis base (chelating or non-chelating) to form Lewis base stabilized dialkylaluminum cation. For purposes of illustration, dialkylaluminum cation precursor can comprise $AlR^P{}_2$ that is paired with an aluminoxane (AO) backbone, where each $R^P$ independently comprises a hydrocarbyl group having up to about 20 carbon atoms. For example, a dialkylaluminum cation precursor can be attached to one or two alkyl groups on the AO backbone through alkyl bridging bonding (called three-center-two-electron bond or 3c-2e bond):

AO backbone   Dialkylaluminum cation precursor ($\sim\!\sim\!\sim$ is a bulk AO structure).

In another example for purposes of illustration, a dialkylaluminum cation precursor can be attached to one or two oxygen atoms on the AO backbone:

AO backbone    Dialkylaluminum cation precursor ($\sim\sim\sim$ is a bulk AO structure).

In another example, for purposes of illustration, a dialkylaluminum cation precursor may form through the coordination of a trialkylaluminum $AlR^P_3$ to a coordinatively unsaturated aluminum center:

AO backbone    Dialkylaluminum cation precursor ($\sim\sim\sim$ is a bulk AO structure)

In these AO backbone/dialkyl aluminum cation precursor examples, each $R^B$ can independently comprise one or more hetero atoms, such as F, Cl, Br, O, N, etc., a group containing at least one of the hetero atoms, or a hydrocarbyl group having up to about 20 carbon atoms. Each $R^P$ can independently comprises a hydrocarbyl group having up to about 20 carbon atoms.

For purposes of describing this invention, the term "dialkylaluminum cation precursor agent" means $R^2_2AlY$, where each $R^2$ independently comprises a hydrocarbyl group having up to about 20 carbon atoms and Y comprises a hetero atom or group. For purposes of illustration, without limiting this invention, the dialkylaluminum cation precursor agent can either coordinate to an unsaturated aluminum site through a hetero atom to form the dialkylaluminum cation precursor or replace a coordinated trialkylaluminum to form an electronically modified (e.g., with Y=F), sterically modified (e.g., with Y=2,6-di-tBu-4-Me-Phenoxy (BHT)), or both electronically and sterically modified (e.g., with Y=pentafluorophenoxy) dialkylaluminum precursor to enhance the formation of the dialkylaluminum cation when such a dialkylaluminum precursor contacts a Lewis base. For purposes of illustration, after the treatment with a dialkylaluminum cation precursor agent, the generated or modified dialkylaluminum precursor can have one or more structures, some examples of which follow:

AO backbone    Dialkylaluminum cation precursor ($\sim\sim\sim$ is a bulk AO structure),

AO backbone    Dialkylaluminum cation precursor ($\sim\sim\sim$ is a bulk AO structure)

AO backbone    Dialkylaluminum cation precursor ($\sim\sim\sim$ is a bulk AO structure), AO backbone    Dialkylaluminum cation precursor ($\sim\sim\sim$ is a bulk AO structure).

We have found that significantly more metallocene molecules can be activated with the same amount of an AO after treatment with the dialkylaluminum cation precursor agent.

Intermediate Compositions

Intermediate compositions of this invention can be formed by combining at least a carrier/support, an organoaluminum compound, and an oxygen source. The oxygen source can be any source of an oxygen atom including $O_2$, $H_2O$, and can be water that is contained in the carrier/support. This invention is not limited to any specific order of addition when combining components. For example, the order of addition may be [(carrier/support+oxygen source)+organoaluminum compound], or it may be [(organoaluminum compound+oxygen source)+carrier/support]. In addition, an oxygenated organoaluminum compound, for example, MAO, can be combined with a carrier/support. As used herein, an oxygenated organoaluminum compound is a compound that has been derived from at least an organoaluminum compound and an oxygen source. The purpose of forming this intermediate composition is to generate Lewis acid sites (i.e., sites suitable for accepting at least one electron pair) to react with the dialkylaluminum cation precursor agent to generate dialkylaluminum cation precursors on the carriers/supports. The raw material of a carrier can contain absorbed water, which can serve as the source of oxygen. A second source of oxygen then becomes optional. The carrier containing water can then be combined with an organoaluminum compound, for example, trimethylaluminum (TMA), to form the intermediate composition. The carrier/support can be dried first to eliminate absorbed water and then a predetermined amount of water can be added back to the carrier/support for more precise control of the water content. For example, when the carrier comprises silica, water content can be from about 1 wt % to about 30 wt %, or from about 5 wt % to about 15 wt %, or from about 8 wt % to about 12 wt %, based in the total weight of the carrier. The oxygen source can be combined with the organoaluminum compound to form a first product (e.g., MAO formed from water and TMA or from $Ph_3COH$ and TMA), followed by forming a second product (composition derived from carrier/support and oxygenated organoaluminum compound) by combining the first product with a dried or non-dried carrier/support.

Carriers/Supports

Carriers containing water useful in compositions according to this invention comprise inorganic carriers or organic carriers. Such carriers contain water and particularly, are those in which absorbed water has not been perfectly eliminated. Also, such carriers may be those in which a predetermined amount of water has been added after the absorbed water is completely or incompletely eliminated therefrom. This invention provides that such carriers can contain up to a percentage of water such that free water is not leaching out of the carrier. Such carriers can be either non-calcined or low-temperature calcined. As used herein, a "non-calcined" carrier is a carrier that has not purposely been subjected to calcining treatment, and a "low-temperature calcined" carrier is carrier that has been calcined at a temperature up to less than 200° C., or up to about 100° C., or at about 50° C. The calcination time can be at about 86° C. for about 4 hours. Further, the calcination may be performed in any atmosphere, for example, in an atmosphere of air or an inert gas, or under a vacuum.

Carriers containing water that are useful in activator compositions according to this invention comprise inorganic carriers or organic carriers. A plurality of carriers can be used as a mixture, and carriers of this invention may comprise water as absorbed water or in hydrate form. A carrier of this invention may be porous and have a total pore volume of not less than 0.1 ml/g of silica, or not less than 0.3 ml/g. A carrier of this invention may have a total pore volume of about 1.6 ml/g of silica. The average particle diameter of the carrier may be from about 5 micrometers to about 1000 micrometers, or from about 10 micrometers to about 500 micrometers.

One silica useful in this invention is porous and has a surface area in the range of from about 10 $m^2/g$ silica to about 1000 $m^2/g$ silica, including the range of about 10 $m^2/g$ silica to about 700 $m^2/g$ silica, a total pore volume in the range of from about 0.1 cc/g silica to about 4.0 cc/g silica, and an average particle diameter in the range of from about 10 micrometers to about 500 micrometers. A silica useful in this invention can have a surface area in the range of from about 50 $m^2/g$ to about 500 $m^2/g$, a pore volume in the range of from about 0.5 cc/g to about 3.5 cc/g, and an average particle diameter in the range of from about 15 micrometers to about 150 micrometers. A useful silica may have a surface area in the range of from about 200 $m^2/g$ to about 350 $m^2/g$, a pore volume in the range of from about 1.0 cc/g to about 2.0 cc/g, and an average particle diameter in the range of from about 10 micrometers to about 110 micrometers.

An average pore diameter of a typical porous silicon dioxide carrier useful in this invention is in the range of from about 10 angstroms to about 1000 angstroms, or from about 50 angstroms to about 500 angstroms, or from about 175 angstroms to about 350 angstroms. A typical content of hydroxyl groups is from about 2 mmol OH/g silica to about 10 mmol OH/g silica, with or without the presence of hydrogen-bonded water, as determined by the following Grignard reaction. Most of these active OH groups react readily with benzylmagnesium chloride Grignard to produce toluene, and this reaction can be used to quantify the concentration of active OH groups on a particular silica. Alternatively, triethylaluminum can be used for the titration in place of a Grignard reagent. A typical content of hydroxyl groups is from about 2 mmol OH/g silica to about 10 mmol OH/g silica, or about 3 mmol OH/g silica to about 8 mmol OH/g silica, or from about 3.3 mmol OH/g silica to about 7.2 mmol OH/g silica.

Example inorganic carriers that may be useful in this invention include inorganic oxides, magnesium compounds, clay minerals and the like. The inorganic oxides can comprise silica, alumina, silica-alumina, magnesia, titania, zirconia, and clays. Example inorganic oxides useful in this invention include, without limitation, $SiO_2$, $Al_2O_3$, MgO, $ZrO_2$, $TiO_2$, $B_2O_3$, CaO, ZnO, BaO, $ThO_2$ and double oxides thereof, e.g. $SiO_2$—$Al_2O_3$, $SiO_2$—MgO, $SiO_2$-$iO_2$, $SiO_2$—$TiO_2$—MgO. Example magnesium compounds useful in this invention include $MgCl_2$, MgCl(OEt) and the like. Example clay minerals useful in this invention include kaolin, bentonite, kibushi clay, geyloam clay, allophane, hisingerite, pyrophyllite, talc, micas, montmorillonites, vermiculite, chlorites, palygorskite, kaolinite, nacrite, dickite, halloysite and the like.

Example organic carriers that may be useful in this invention include acrylic polymer, styrene polymer, ethylene polymer, propylene polymer and the like. Example acrylic polymers that may be useful in this invention include polymers of acrylic monomers such as acrylonitrile, methyl acrylate, methyl methacrylate, methacrylonitrile and the like, and copolymers of the monomers and crosslinking polymerizable compounds having at least two unsaturated bonds. Example styrene polymers that may be useful in this invention include polymers of styrene monomers such as styrene, vinyltoluene, ethylvinylbenzene and the like, and copolymers of the monomers and crosslinking polymerizable compounds having at least two unsaturated bonds. Example crosslinking polymerizable compound having at least two unsaturated bonds include divinylbenzene, trivinylbenzene, divinyltoluene, divinylketone, diallyl phthalate, diallyl maleate, N,N'-methylenebisacrylamide, ethylene glycol dimethacrylate, polyethylene glycol dimethacrylate and the like.

Organic carrier useful in this invention has at least one polar functional group. Examples of suitable polar functional groups include primary amino group, secondary amino group, imino group, amide group, imide group, hydrazide group, amidino group, hydroxyl group, hydroperoxy-group, carboxyl group, formyl group, methyloxycarbonyl group, carbamoyl group, sulfo group, sulfino group, sulfeno group, thiol group, thiocarboxyl group, thioformyl group, pyrrolyl group, imidazolyl group, piperidyl group, indazolyl group and carbazolyl group. When the organic carrier originally has at least one polar functional group, the organic carrier can be used as it is. One or more kinds of polar functional groups can also be introduced by subjecting the organic carrier as a matrix to a suitable chemical treatment. The chemical treatment may be any method capable of introducing one or more polar functional groups into the organic carrier. For example, it may be a reaction between acrylic polymer and polyalkylenepolyamine such as ethylenediamine, propanediamine, diethylenetriamine, tetraethylenepentamine, dipropylenetriamine or the like. As the specific method of such a reaction, for example, there is a method of treating an acrylic polymer (e.g. polyacrylonitrile) in a slurry state in a mixed solution of ethylenediamine and water at 100° C. or more, for example from 120° C. to 150° C. The amount of polar functional group per unit gram in the organic carrier having a polar functional group may be from 0.01 to 50 mmol/g, or from 0.1 to 20 mmol/g.

Organoaluminum Compounds

Organoaluminum compounds useful in this invention can comprise $AlR_n(XR^1_m)_{(3-n)}$ wherein Al is aluminum; each R is hydrogen or a hydrocarbyl group having up to about 20 carbon atoms, and each R may be the same as, or different from, any other R; for each $XR^1$, X is a hetero atom and $R^1$ is an organic group bonded to the Al through the hetero atom and having up to about 20 carbon atoms; each $XR^1$ may be the same as, or different from, any other $XR^1$; and n is 1, 2, or 3. When X is halide, m=0; when X is O or S, m=1; when X is N or P, m=2. Each R can be a straight-chain or branched alkyl group. Non-limiting examples of R include alkyl groups having from 1 to about 10 carbon atoms such as methyl, ethyl, n-propyl, isopropyl, n-butyl, isobutyl, n-pentyl, neopentyl and the like.

Non-limiting examples of $AlR_n(XR^1_m)_{(3-n)}$ useful in this invention include, for compounds with n=3: trimethylaluminum, triethylaluminum, triisobutylaluminum, trioctylaluminum, diisobutylaluminum hydride, diethylaluminum hydride, dimethylaluminum hydride; for compounds with n=1 or 2 and m=0: $AlMe_2Cl$, $AlMeCl_2$, $AlMe2F$, $AlMeF_2$; for compounds with n=1 or 2 and m=1: (2,6-di-tert-butyl-4-methylphenoxy)diisobutylaluminum, bis(2,6-di-tert-butyl-4-methylphenoxy)isobutylaluminum, (2,6-di-tert-butyl-4-methylphenoxy)diethylaluminum, bis(2,6-di-tert-butyl-4-methylphenoxy)ethylaluminum, (2,6-di-tert-butyl-4-methylphenoxy)dimethylaluminum, bis(2,6-di-tert-butyl-4-methylphenoxy)methylaluminum, $AlMe_2(O^tBu)$, $AlMe(O^tBu)_2$, $AlMe_2(OCPh_3)$, $AlMe(OCPh_3)_2$; for compounds with n=1 or 2 and m=2: $AlMe_2(NMe_2)$, $AlMe(NMe_2)_2$, $AlMe_2(NEt_2)$, $AlMe(NEt_2)_2$, $AlEt_2(NMe_2)$, $AlEt(NMe_2)_2$, $AlEt_2(NEt_2)$, $AlEt(NEt_2)_2$, $Al^iBu_2(NMe_2)$, $Al^iBu\,(NMe_2)_2$, $Al_iBu_2(NEt_2)$, $Al^iBu\,(NEt_2)_2$, $AlMe_2(N(SiMe_3)_2)$, $AlMe(N(SiMe_3)_2)_2$; and mixtures thereof.

Organoaluminum compounds of this invention can be prepared by any suitable method, including currently known methods, as will be familiar to those skilled in the art, or methods that may come to be known.

Oxygen Source

The oxygen source can be any source of an oxygen atom, e.g., water in the carrier. Otherwise, the oxygen source can be any suitable oxygen source, as will be familiar to those skilled in the art given the teaching of this specification. Examples include but are not limited to 1) free form of water in either the gas phase or the condensed phase (liquid or solid), 2) a coordinated form of water such as hydrated metal salts (e.g., $LiOH(H_2O)_n$), 3) water absorbed on compounds containing hydroxy groups, molecular sieves, and the like. Additionally, the oxygen source can be hydroxy or carbonyl containing compounds in which the oxygen atom is directly linked to either a tertiary carbon and a hydrogen, for example, $^tBUOH$, $Ph_3COH$, and the like, or a tertiary carbon and an Al after reacting with a trialkylaluminum, for example, PhCOMe, PhCOOH, and the like. Depending on the organoaluminum compound in use, the amount of oxygen source can be adjusted so that each of a majority (at least about 50 mol %) of the oxygen atoms therein contacts at least two aluminum atoms. The Al:O mol ratio can be about 100:1, about 50:1, about 10:1, about 1:1, about 1:1.2, or can be a ratio such that the amount of hydroxy or alkoxy residue does not significantly interact with the active catalyst species generated during methods of this invention.

Dialkylaluminum Cation Precursor Agent

Dialkylaluminum cation precursor agents useful in this invention include $R^2_2AlY$, wherein each $R^2$ independently comprises a hydrocarbyl group having up to about 20 carbon atoms, Al is aluminum, and Y comprises a hetero atom or group bonded to the Al. Each hydrocarbyl group can comprise one or more heteroatom substituted groups, although this is not required. Y can comprise, for example, a hetero atom such as O, N, etc., or a group such as halide radical, pseudo halide radical, alkoxide radical, aryloxide radical, alkyl substituted amide radical, aryl substituted amide radical, siloxy radical, boronoxy radical, diaryl boronoxy radical, halogenated diaryl boronoxy radical, and the like.

Suitable dialkylaluminum cation precursor agents include, for example, dimethylaluminum fluoride ($Me_2AlF$), dimethylaluminum chloride, diethylaluminum fluoride, diethylaluminum chloride, di-n-propylaluminum fluoride, diisobutylaluminum chloride, di-n-butylaluminumchloride, diisobutylaluminum fluoride, di-n-hexylaluminum chloride, dimethylaluminum methoxide, dimethylaluminum ethoxide, dimethylaluminum isobutoxide, dimethylaluminum phenoxide, dimethylaluminum pentafluorophenoxide ($Me_2Al(OC_6F_5)$), dimethylaluminum (2,6-di-t-butyl-4-methyl)phenoxide ($Me_2Al(BHT)$), dimethylaluminum (2,6-di-isobutyl) phenoxide, dimethylaluminum dimethylamide, dimethylaluminum diethylamide, dimethylaluminum dibutylamide, dimethylaluminum methylphenylamide, diethylaluminum methoxide, diethylaluminum ethoxide, diethylaluminum isobutoxide, diethylaluminum phenoxide, diethylaluminum pentafluorophenoxide, diethylaluminum (2,6-di-t-butyl-4-methyl)phenoxide, diethylaluminum (2,6-di-isobutyl)phenoxide, diethylaluminum dimethylamide, diethylaluminum diethylamide, diethylaluminum dibutylamide, diethylaluminum methylphenylamide, diisobutylaluminum methoxide, diisobutylaluminum ethoxide, diisobutylaluminum methoxide, diisobutylaluminum phenoxide, diisobutylaluminum pentafluorophenoxide, diisobutylaluminum (2,6-di-t-butyl-4-methyl)phenoxide, diisobutylaluminum (2,6-di-isobutyl)phenoxide, diisobutylaluminum dimethylamide, diisobutylaluminum diethylamide, diisobutylaluminum dibutylamide, diisobutylaluminum methylphenylamide, and the like.

Dialkylaluminum cation precursor agent can also be generated in-situ by mixing $AlR^2_3$ (e.g., $AlMe_3$) with $AlR^2Y_2$ (e.g., $AlMeF_2$) or $AlY_3$ (e.g., $AlF_3$). The $AlR^2_3$ can be combined with an intermediate composition derived from at least an organoaluminum compound, a carrier, and an oxygen source, or can be coordinated with or a part of the MAO framework.

Lewis Base

The Lewis base component is optional. When included, the Lewis base can be chelating or non-chelating. The Lewis base is a reagent that is able to donate at least one pair of electrons to form a stable dialkylaluminum cation complex derived from the dialkylaluminum cation precursor in the system, including N, O, or halide donors. For example, suitable Lewis bases include non-chelating Lewis bases such as $PhNMe_2$, $PhNEt_2$, $PhNPr_2$, $Ph_2NMe$, $Ph_2Net$, $Ph_2NPr$, $NMe_3$, $NEt_3$, $Me_3SiOSiMe_3$, EtOEt, THF (tetrahydrofuran), PhOMe, $^tBuOMe$, ClPh, FPh, and the like and chelating Lewis bases such as $Me_2N(CH_2)_2NMe_2$, $Et_2N(CH_2)_2NEt_2$, $Ph_2N(CH_2)_2NPh_2$, $Me_2N(CH_2)_3NMe_2$, $Et_2N(CH_2)_3NEt_2$, $Ph_2N(CH_2)_3NPh_2$, $Me_3SiOSi(Me)_2OSiMe_3$ (OMTS), $MeO(CH_2)_2OMe$, $EtO(CH_2)_2OEt$, $PhO(CH_2)_2OPh$, $MeO(CH_2)_3OMe$, $EtO(CH_2)_3OEt$, $Ph_2O(CH_2)OPh$, and the like.

Preparation of Compositions of this Invention

Activator compositions according to this invention can be derived from at least carrier, oxygen source, organoaluminum compound, and dialkylaluminum cation precursor agent. The carrier can be combined with the organoaluminum compound and oxygen source to form an intermediate composition, and at least a portion of the intermediate composition can be combined with the dialkylaluminum cation precursor agent to form an activator composition of this invention. The oxygen source can be water that is already in the carrier. Also, the organoaluminum and oxygen source (e.g., water) can be pre-combined to form an oxygenated organoaluminum compound that is then combined with the carrier to form an intermediate composition. Water as used in methods of this invention can be potable water.

The combining can be conducted in an inert gas atmosphere; at a temperature from about −80° C. to about 200° C., or from about 0° C. to about 150° C.; the combining time can be from about 1 minute to about 36 hours, or from about 10 minutes to about 24 hours. Example treatments after completion of the combining operation include filtration of supernatant, followed by washing with inert solvent and evaporation of solvent under reduced pressure or in inert gas flow, but these treatments are not required. Resulting activator composition can be used for polymerization in any suitable state, including fluid, dry, or semi-dry powder, and may be used for polymerization in the state of being suspended in inert solvent. The combining of carrier, oxygen source, and organoaluminum compound can be conducted at ambient temperature and at a combining time of from about 15 minutes to about 48 hours, or from about 15 minutes to about 6 hours; the resulting combination can be used as is or subsequently heated to a temperature of about 80° C. to about 150° C. Alternatively, the combining of carrier, oxygen source, and organoaluminum compound can be conducted at a temperature of from about 80° C. to about 150° C. at a combining time of from about 15 minutes to about 6 hours. At least a portion of resulting intermediate composition is combined with dialkylaluminum cation precursor agent.

The mol % ratio of Al from the dialkylaluminum cation precursor agent ($R^2{}_2AlY$) to Al in the intermediate composition can be from about 1:30, from about 8:25, or from about 12:17, or other ratios that fall within the about 1:30 range. However, depending on the physical properties of the carrier, the mol % ratio can vary outside of the 1:30 range as needed, as can be determined by one skilled in the art given the teachings provided in this specification.

The amount of aluminum atom in the product, e.g., solid component, obtained by combining low-temperature calcined carrier and trialkylaluminum compound can be not less than about 0.1 mmol aluminum atom, or not less than about 1 mmol aluminum atom, in 1 g of the solid component in the dry state.

Without limiting this invention, compositions hereof can be prepared by (i) combining carrier containing water with organoaluminum compound, then adding dialkylaluminum cation precursor agent; (ii) combining MAO with carrier, then adding dialkylaluminum cation precursor agent; or (iii) combining carrier with water, then adding organoaluminum compound, then adding dialkylaluminum cation precursor agent.

Catalysts for Olefin Polymerization

Activator compositions of this invention are useful in catalysts for olefin polymerization. Activator composition according to this invention and transition metal component may each be added independently, yet substantially simultaneously, to monomer to catalyze polymerization. Activator composition and transition metal component may be combined to form product and at least a portion of product may be added to monomer to catalyze polymerization. The Al:transition metal ratio can be about 1:1 to about 1000:1, e.g., can be about 200:1 to about 300:1.

Catalysts for Olefin Polymerization—Transition Metal Component

Transition metal component can comprise any transition metal component having olefin polymerization potential. For example, without limitation, transition metal component can comprise one or more metallocene transition metal components.

Transition metal component can comprise catalyst precursor $ML_aQ_{q-a}$ (wherein M represents transition metal atom of the 4th Group or Lanthanide Series of the Periodic Table of Elements (1993, IUPAC), and examples thereof include transition metals of the 4th Group of the Periodic Table, such as titanium atom, zirconium atom and hafnium atom and transition metals of the Lanthanide Series, such as samarium; L represents group having cyclopentadienyl skeleton or group having at least one hetero atom, at least one L being group having cyclopentadienyl skeleton, and a plurality of L may be the same or different and may be crosslinked to each other; Q represents halide radicals, alkoxide radicals, amide radicals, and hydrocarbyl radicals having 1 to about 20 carbon atoms; "a" represents a numeral satisfying the expression $0<a\leq q$; and q represents valence of transition metal atom M).

In L in transition metal component, group having cyclopentadienyl skeleton can comprise, for example, cyclopentadienyl group, substituted cyclopentadienyl group or polycyclic group having cyclopentadienyl skeleton. Example substituted cyclopentadienyl groups include hydrocarbon group having 1 to about 20 carbon atoms, halogenated hydrocarbon group having 1 to about 20 carbon atoms, silyl group having 1 to about 20 carbon atoms and the like. Silyl group according to this invention can include $SiMe_3$ and the like. Examples of polycyclic group having cyclopentadienyl skeleton include indenyl group, fluorenyl group and the like. Examples of hetero atom of the group having at least one hetero atom include nitrogen atom, oxygen atom, phosphorous atom, sulfur atom and the like.

Example substituted cyclopentadienyl groups include methylcyclopentadienyl group, ethylcyclopentadienyl group, n-propylcyclopentadienyl group, n-butylcyclopentadienyl group, isopropylcyclopentadienyl group, isobutylcyclopentadienyl group, sec-butylcyclopentadienyl group, tertbutylcyclopentadienyl group, 1,2-dimethylcyclopentadienyl group, 1,3-dimethylcyclopentadienyl group, 1,2,3-trimethylcyclopentadienyl group, 1,2,4-trimethylcyclopentadienyl group, tetramethylcyclopentadienyl group, pentamethylcyclopentadienyl group and the like.

Example polycyclic groups having cyclopentadienyl group include indenyl group, 4,5,6,7-tetrahydroindenyl group, fluorenyl group and the like.

Example groups having at least one hetero atom include methylamino group, tert-butylamino group, benzylamino group, methoxy group, tert-butoxy group, phenoxy group, pyrrolyl group, thiomethoxy group and the like.

One or more groups having cyclopentadienyl skeleton, or one or more group having cyclopentadienyl skeleton and one or more group having at least one hetero atom, may be crosslinked with (i) alkylene group such as ethylene, propylene and the like; (ii) substituted alkylene group such as isopropylidene, diphenylmethlylene and the like; or (iii) silylene group or substituted silylene group such as dimethylsilylene group, diphenylsilylene group, methylsilylsilylene group and the like.

Q in transition metal component comprises halide radicals, alkoxide radicals, amide radicals, hydrogen radical, or hydrocarbyl radicals having 1 to about 20 carbon atoms. Examples of Q include Cl, F, Br, MeO, EtO, PhO, C6F5O, BHT, Me2N, Et2N, Ph2N, (Me3Si)2N, alkyl group having 1 to about 20 carbon atoms such as methyl group, ethyl group, n-propyl group, isopropyl group, n-butyl group, benzyl group, silyl groups such as Me3Si, Ph3Si, and the like.

Examples of transition metal component $ML_a Q_{q-a}$, wherein M comprises zirconium, include bis(cyclopentadienyl)zirconium dichloride, bis(methylcyclopentadienyl)zirconium dichloride, bis(pentamethylcyclopentadienyl)zirconiumdimethyl, bis(indenyl)zirconium dichloride, bis(4,5,6,7-tetrahydroindenyl)zirconium dichloride, bis(fluorenyl)zirconium dichloride, ethylenebis(indenyl)zirconium dichloride, dimethylsilylene(cyclopentadienylfluorenyl)zirconium dichloride, diphenylsilylenebis(indenyl)zirconium dichloride, cyclopentadienyldimethylaminozirconium dichloride, cyclopentadienylphenoxyzirconium dichloride, dimethyl(tert-butylamino)(tetramethylcyclopentadienyl) silanezirconium dichloride, isopropylidene(cyclopentadienyl)(3-tert-butyl-5-methyl-2-phenoxy)zirconium dichloride, dimethylsilylene(tetramethylcyclopentadienyl)(3-tert-butyl-5-methyl-2-phenoxy) zirconium dichloride, bis(cyclopentadienyl)zirconiumdimethyl, bis(methylcyclopentadienyl)zirconiumdimethyl, bis(pentamethylcyclopentadienyl)zirconiumdimethyl, bis(indenyl)zirconiumdimethyl, bis(4,5,6,7-tetrahydroindenyl)zirconiumdimethyl, bis(fluorenyl)zirconiumdimethyl, ethylenebis(indenyl)zirconiumdimethyl, dimethylsilylene(cyclopentadienylfluorenyl)zirconiumdimethyl, diphenylsilylenebis(indenyl)zirconiumdimethyl, cyclopentadienyldimethylaminozirconiumdimethyl, cyclopentadienylphenoxyzirconium dimethyl, dimethyl(tert-butylamino)(tetramethylcyclopentadienyl) silanezirconiumdimethyl, isopropylidene(cyclopentadienyl)(3-tert-butyl-5-methyl-2-phenoxy)zirconiumdimethyl, dimethylsilylene(tetramethylcyclopentadienyl)(3-tertbutyl-5-methyl-2-phenoxy) zirconiumdimethyl and the like.

Additional exemplary transition metal components $ML_a Q_{q-a}$ include components wherein zirconium is replaced with titanium or hafnium in the above zirconium components.

Additional exemplary transition metal components $ML_a Q_{q-a}$ include components wherein Q can be the same or different in one molecule.

Other catalyst precursors useful in this invention are: rac-dimethylsilylbis(2-methyl-4-phenyl-indenyl)zirconium dimethyl (M1); rac-dimethylsilylbis(2-methyl-4-phenyl-indenyl)zirconium dichloride (M1dc); rac-dimethylsilylbis(2-methyl-1-indenyl) zirconium dimethyl (M2); rac-dimethylsilylbis(2-methyl-4,5-benzoindenyl) zirconium dimethyl (M3); rac-ethylenebis(tetrahydroindenyl)zirconium dimethyl (M4); rac-ethylenebis-(tetrahydroindenyl)zirconium dichloride (M4dc); and rac-ethylenebis(indenyl) zirconium dimethyl (M5), bis(1-butyl-3-methylcyclopentadienyl) zirconium dimethyl (M6), bis(1-butyl-3-methylcyclopentadienyl) zirconium dichloride (M6dc).

Polymerization Using Activator Compositions of this Invention

When using activator compositions of the present invention in polymerization, any olefin or dioelfin having 2 to 20 carbon atoms can be used as a monomer for polymerization. Specific examples thereof include ethylene, propylene, butene-1, pentene-1, hexene-1, heptene-1, octene-1, nonene-1, decene-1, hexadecene-1, eicocene-1,4-methylpentene-1,5-methyl-2-pentene-1, vinylcyclohexane, styrene, dicyclopentadiene, norbornene, 5-ethylidene-2-norbornene and the like, but are not limited thereto. In the present invention, copolymerization can be conducted using two or more monomers, simultaneously. Specific examples of the monomers constituting the copolymer include ethylene/an α olefin such as ethylene/propylene, ethylene/butene-1, ethylene/hexene-1, ethylene/propylene/butene-1, ethylene/propylene/5-ethylidene-2-norbornene and the like, propylene/butene-1, and the like, but are not limited thereto.

The polymerization method is not limited, and both liquid phase polymerization method and gas phase polymerization method can be used. Examples of solvent used for liquid phase polymerization include aliphatic hydrocarbons such as butane, pentane, heptane, octane and the like; aromatic hydrocarbons such as benzene, toluene and the like; and hydrocarbon halides such as methylene chloride and the like. It is also possible to use at least a portion of the olefin to be polymerized as a solvent. The polymerization can be conducted in a batch-wise, semibatch-wise or continuous manner, and polymerization may be conducted in two or more stages which differ in reaction conditions. The polymerization temperature can be from about −50° C. to about 200° C., or from 0° C. to about 100° C. The polymerization pressure can be from atmospheric pressure to about 100 kg/cm$^2$, or from atmospheric pressure to about 50 kg/cm$^2$. Appropriate polymerization time can be determined by means known to those skilled in the art according to the desired olefin polymer and reaction apparatus, and is typically within the range from about 1 minute to about 20 hours. In the present invention, a chain transfer agent such as hydrogen may be added to adjust the molecular weight of olefin polymer to be obtained in polymerization.

Organoaluminum compound can be added during polymerization to remove impurities, such as water. Organoaluminum compound useful herein can comprise a variety of organoaluminum compounds, including at least one currently known organoaluminum compound, for example, organoaluminum compound $R^3_c AlY_{3-c}$ (wherein $R^3$ represents a hydrocarbon group having 1 to about 20 carbon atoms; Y represents hydrogen atom and/or halogen atoms; and "c" represents an integer of 0 to 3). Specific examples of $R^3$ include methyl group, ethyl group, n-propyl group, n-butyl group, isobutyl group, n-hexyl group and the like. Specific examples of the halogen atom for Y include fluorine atom, chlorine atom, bromine atom and iodine atom. Specific examples of the organoaluminum compound $R^3_c AlY_{3-c}$ include trialkylaluminums such as trimethylaluminum, triethylaluminum, tri-n-propylaluminum, trisobutylaluminum, tri-n-hexylaluminum and the like; dialkylaluminum chloride such as dimethylaluminum chloride, diethylaluminum chloride, di-n-propylaluminum chloride, diisobutylaluminum chloride, di-n-hexylaluminum chloride and the like; alkylaluminum dichlorides such as methylaluminumdichloride, ethylaluminum dichloride, n-propylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, diisobutylaluminum hydride, di-n-hexylaluminum hydride and the like.

EXAMPLES

The following examples are illustrative of the principles of this invention. It is understood that this invention is not limited to any one specific embodiment exemplified herein, whether in the examples or the remainder of this patent application.

Example 1

Identification of [Me$_2$Al]$^+$ Precursor in MAO

Figure 1:
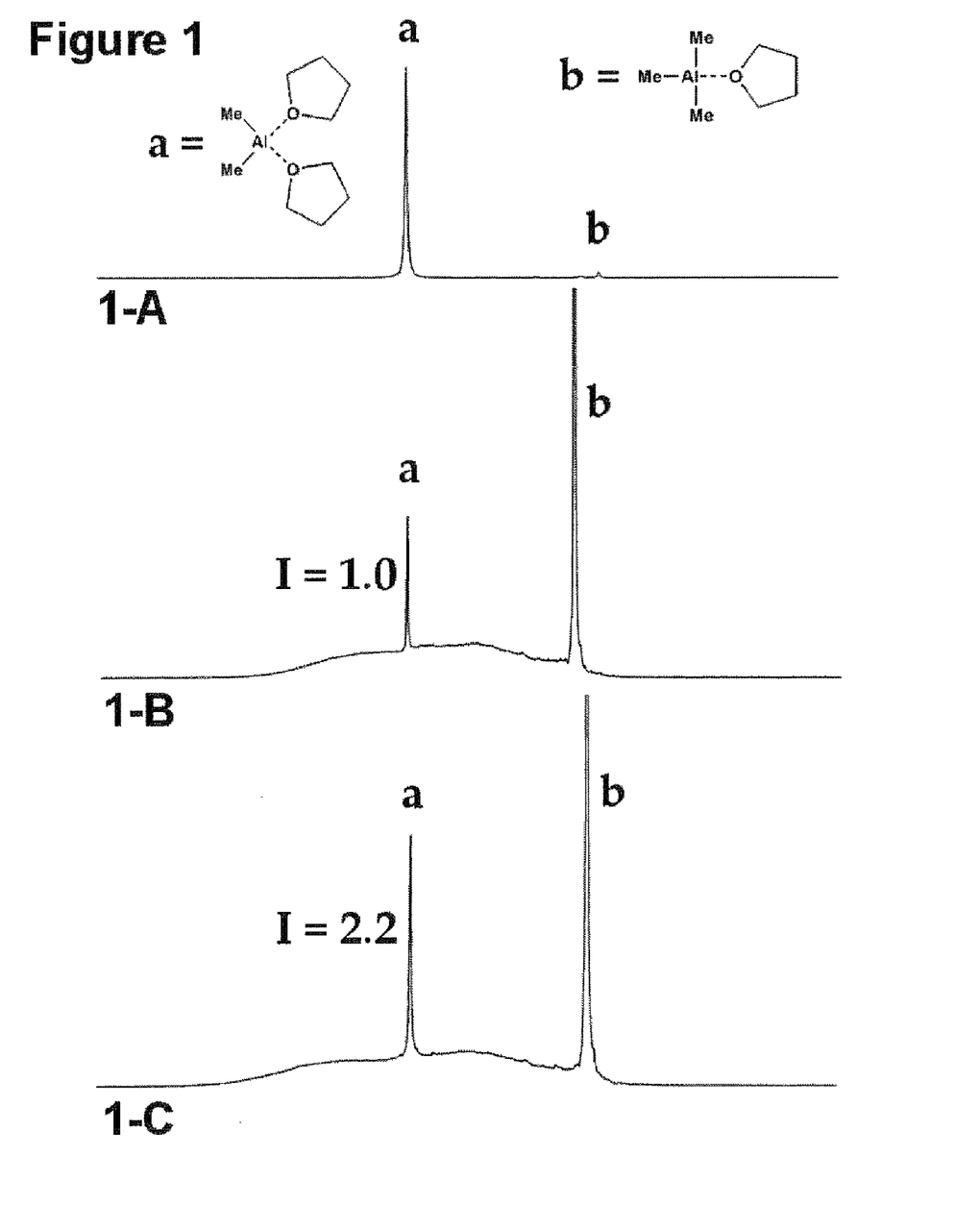
FIG. 1 is an $^1$H NMR spectra as described further in Example 1.

This experiment used NMR spectroscopy to identify the [Me$_2$Al]$^+$ precursor in MAO based on the reaction below (Reaction 1):

THF can partially extract the [Me$_2$Al]$^+$ precursor in MAO to form a complex with the cation part [Me$_2$Al]$^+$(THF)$_2$ showing the Me signal as a singlet peak on the left side of AlMe$_3$ (THF) in the $^1$H NMR (FIG. 1-B). The [Me$_2$Al]$^+$(THF)$_2$ part can also form from the reaction of [(C$_6$F$_5$)$_4$B]$^-$[PhNMe$_2$H]$^+$ with AlMe$_3$ in the present of THF (Reaction 2):

The Me signal region is shown in FIG. 1-A. When a small amount of the product of Reaction 2 was spiked to an MAO THF solution (Me region shown as FIG. 1-B), the singlet peak on the left side of AlMe$_3$(THF) was increased from an intensity of 1.0 to 2.2 (FIG. 1-C), indicating that the left side singlet peak is [Me$_2$Al]$^+$(THF)$_2$.

Example 2

Increasing [Me$_2$Al]$^+$ Precursor Concentration in Silica-Supported MAO by the Treatment of a [Me$_2$Al]$^+$ Precursor Agent Me$_2$AlF This experiment used the silica supported MAO sample (Experiment 5-2a) and the derived Me$_2$AlF treated silica supported MAO sample (Experiment 6-2a), respectively, for the NMR studies to show that the [Me$_2$Al]$^+$ precursor in the supported MAO was significantly increased by such a treatment.

Figure 2:
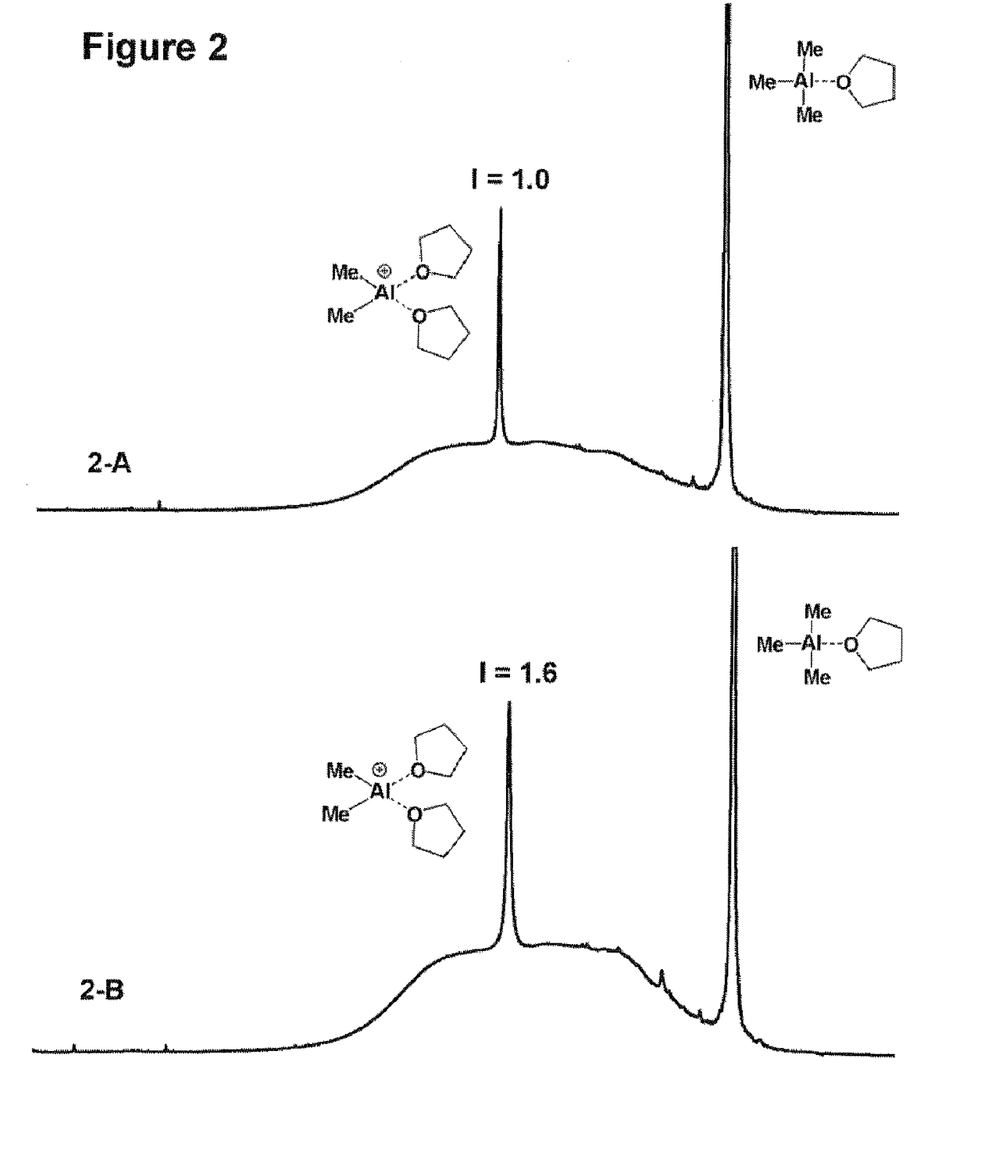
FIG. 2 is an $^1$H NMR spectra as described further in Example 2.

About 50 mg of the solid sample and about 40 mg of diphenylethane (DPE, as internal standard) were weighed (to nearly 0.1 mg) into a 20 ml vial. 2 ml THF-d8 was then added to the vial. As used herein, THF-d8 means a deuterated solvent for NMR signal locking wherein almost all 8 protons of THF (C$_4$H$_8$O) have been replaced by 8 deuterium atoms (C$_4$D$_8$O). The slurry was shaken for 10 min and the slurry was allowed to settle for about 30 min. The supernatant was then sampled for NMR analysis. Quantitative NMR data were acquired and the component contents were calculated based on the internal standard added. The Al-Me region of the $^1$H NMR spectrum for the supernatant of silica supported MAO from Experiment 5-2a is shown in FIG. 2-A, and the Al-Me region of the $^1$H NMR spectrum for the supernatant of the Me$_2$AlF treated silica supported MAO from Experiment 6-2a is shown in FIG. 2-B. Comparing FIGS. 2-A and 2-B, it can be seen that, after the Me$_2$AlF treatment, 60% increase of [Me$_2$Al]$^+$(THF)$_2$ was observed.

This experiment also indicates that MAO and MAO supported on silica have similar metallocene activation characteristics.

Example 3

Figure 3:
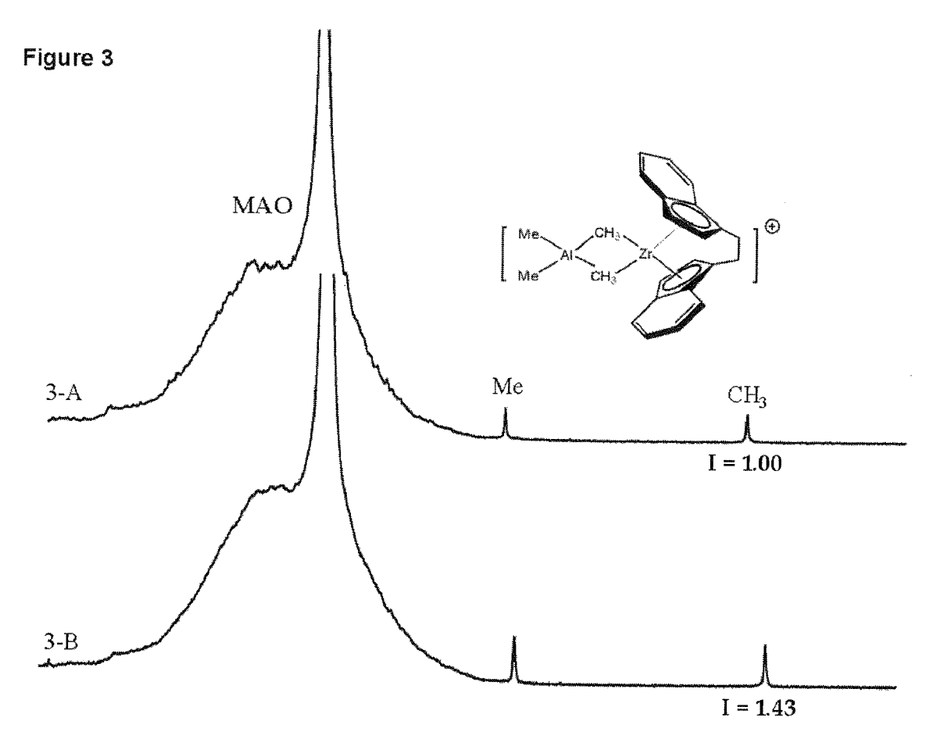
FIG. 3 is an $^1$H NMR spectra as described further in Example 3.

Increasing [L5Zr(□-Me)$_2$AlMe$_2$]$^+$(L5=ligand of M5) Concentration in MAO Activated M5 by the Treatment of a [Me$_2$Al]$^+$ Precursor Agent Me$_2$AlF This experiment used $^1$H NMR spectroscopy to quantify the concentration of dimeric cation, [CP$_2$Zr(□-Me)$_2$AlMe$_2$]$^+$, generated by the reactions of the metallocene M5 with a regular MAO sample and the AlMe$_2$F treated regular MAO sample, respectively, to show that more active dimeric cation, [Cp$_2$Zr(µ-Me)$_2$AlMe$_2$]$^+$ could be generated in the Me$_2$AlF treated MAO than in the mother MAO.

a. Preparation of MAO and Me$_2$AlF Treated MAO Stock Solutions:

2 g of MAO toluene solution (Al 13.65 wt %, Albemarle 30% MAO product) and 0.1122 g of DPE as the internal $^1$H NMR standard were charged to a 20 ml vial. Toluene-d8 was then added to make a 14.959 g of stock solution (Solution I). A Me$_2$AlF toluene solution (25.38%) based on 6 mol % of Al of MAO was weighed and slowly added to a portion of the MAO stock solution in another 20 ml vial under agitation. The mixture was then allowed to agitate for 1 hr, forming another stock solution (Solution II).

b. Reaction with M5:

The M5 solution of toluene-d8 was prepared and its concentration was determined by $^1$H NMR. Based on the ratio of Al:Zr at 200:1, a known amount of M5 solution was slowly added to Solution I (MAO stock solution) and Solution II (Me$_2$AlF treated MAO), respectively. The two solutions were then analyzed with $^1$H NMR spectroscopy in less than 2 hr after the solutions were prepared. The Al-Me/Zr-Me regions of the $^1$H NMR spectra are shown in FIG. 3-A and FIG. 3-B. FIG. 3-A represents untreated MAO. FIG. 3-B represents treated MAO. The treated MAO (FIG. 3-B) shows a 43% increase of the [L5Zr(µ-Me)$_2$AlMe$_2$]$^+$ concentration over untreated MAO (FIG. 3-A).

Example 4

Increasing [Me$_2$Al]$^+$ Precursor Concentration in MAO Through the Treatment of [Me$_2$Al]$^+$ Precursor Agents Me$_2$Al(OC$_6$F$_5$) and Me$_2$Al(BHT)

This experiment used OMTS to extract [AlMe$_2$]$^+$ from two MAO samples treated with Me$_2$Al(OC$_6$F$_5$) and Me$_2$Al(BHT), respectively. The NMR results indicated that both Me$_2$Al(OC$_6$F$_5$) and Me$_2$Al(BHT) could also serve as dialkylaluminum cation precursor agents by increasing the concentration of the dialkylaluminum cation precursors in MAO. Because of the formation of a two-phase liquid (the clathrate or ionic liquid phase and the solution phase) from these two reactions in toluene, NMR quantification was difficult. Therefore, the toluene was removed and replaced with C$_6$H$_5$F solvent to ensure a one-phase solution after OMTS treatment. Only a small amount of toluene-d8 was used for NMR signal locking.

Figure 4:
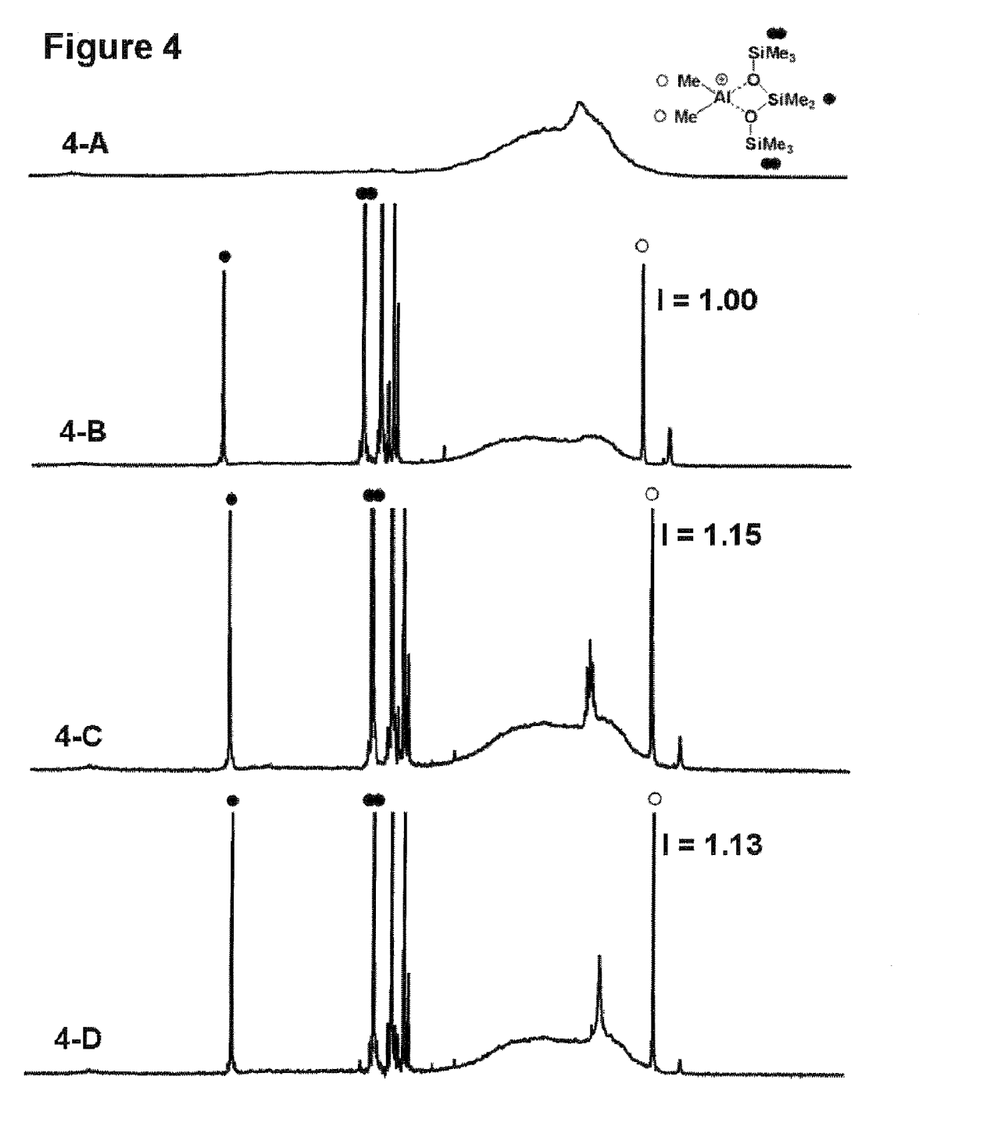
FIG. 4 is an $^1$H NMR spectra as described further in Example 4.

0.262 g of solid MAO (30% MAO of Albemarle product after removal of solvents under vacuum) was charged to a 20 ml vial. C$_6$H$_5$F was added to the solid MAO to give a 6.58 g MAO solution. 3.01 g of MAO solution and 55.8 mg of internal standard DPE were weighed into a 20 ml vial. About 3 g of toluene-d8 were added into the vial, making a stock solution with Al concentration at 0.31 mmol/g. Solutions of Me$_2$Al(OC$_6$F$_5$) and Me$_2$Al(BHT) were prepared by reacting equal molar equivalents of OC$_6$F$_5$ and BHT with TMA. Each solution was added to MAO stock solution based on 4 mol % of Al in MAO. The mixtures were agitated for 1 hr. An OMTS C6H5F solution was then slowly added under agitation to each of the two mixtures based on 8 mol % Al in MAO. The two solutions where then agitated for about 30 min before they were analyzed by $^1$H NMR spectroscopy. The Al-Me regions of the $^1$H NMR spectra for the two treated MAO solutions and the non-treated MAO solution were compared as shown in FIG. 4. FIG. 4-A represents MAO without OMTS treatment. FIG. 4-B represents MAO with OMTS treatment (baseline). FIG. 4-C represents Me$_2$Al(OC$_6$F$_5$) treated MAO with OMTS treatment. FIG. 4-D represents Me$_2$Al(BHT) treated MAO with OMTS treatment.

Because of the ionic nature of the OMTS complex, if too much ionic complex is generated, a two-phase liquid will form to make the NMR quantification of the species in the two phases difficult. Therefore, the more polar solvent C$_6$H$_5$F was used instead of the less polar solvent toluene to dissolve more clathrate without destroying the ion-pair. Lesser amounts (4 mol %) of the dialkylaluminum cation precursor agents (Me$_2$Al(OC$_6$F$_5$) and Me$_2$Al(BHT)) were used to ensure no two-phase liquid formation. Compared to the untreated MAO (FIG. 4-B), even with such a low concentration of dialkylaluminum cation precursor agent treatment, the OMTS stabilized dimethylaluminum cation concentrations were increased by 15% after Me$_2$Al(OC$_6$F$_5$) treatment (FIG. 4-C) and by 12% after Me$_2$Al(BHT) treatment (FIG. 4-D), respectively. These results indicate that both Me$_2$Al(OC$_6$F$_5$) and Me$_2$Al(BHT) are good dialkylaluminum cation precursor agents.

Example 5

Preparation of Composition of this Invention 5-1. Reaction of Carrier Containing Oxygen Source with Organoaluminum Compound This preparation used raw silica containing about 5% absorbed water (determined by LOI) as the carrier (silica) with an oxygen source (water) to react with an organoaluminum compound (TMA).

57.3 g raw silica (Grace 948) in a 150 ml Schlenk flask were degassed under slow N$_2$ flow on the Schlenk line for 1 hr and then brought into the drybox. The degassed silica was transferred to a 300 ml three-neck round bottom flask equipped with a mechanical stirrer and a 50 ml dropping funnel; 250 ml toluene were then added. While the silica slurry in the flask was stirred, a solution of 14.3 g TMA in 30 ml toluene was placed into the dropping funnel and the solution was slowly added to the silica slurry over 1 hr. The mixture was stirred at ambient conditions for 30 min, then heated with an oil-bath at 100° C. for 1 hr. After cooling, the mixture was placed at ambient conditions overnight. The mixture was filtered, washed three times with 10 g toluene, washed three times with 10 g isohexane, and then dried under vacuum to constant weight. Yield: 63.8 g (Al=7.14% from ICP).

Reaction of Carrier with Oxygenated Organoaluminum Compound

The preparations below used MAO, prepared by combining an organoaluminum compound (TMA) and an oxygen source (water), to react with the carrier (silica).

5-2a.

11.6 g of a silica having physical properties similar to Grace 952 (dried at 200° C.) and about 50 g of toluene were mixed in the autoclave base in the drybox. 29 g of MAO (30%, Albemarle product) were then added to the silica suspension with spatula stirring. The autoclave was closed, removed from the drybox, and placed onto the stand. The mixture of MAO and silica was heated to 130° C. for 4 hrs with stirring. After cooling, the autoclave was brought into the drybox. Then the MAO treated silica was filtered and washed three times with 30 g of toluene. Next, the wet MAO treated silica was either washed two times with 30 g of isohexane and dried to constant weight to get a solid sample for future uses or used immediately for next step of preparation. Such a process usually gives an Al loading in the range of 17%-18% by ICP.

5.2a'

The procedure was similar to Example 5-2a but the reaction was done in the drybox in an open reaction flask that only allowed the internal reaction temperature to reach the toluene boiling temperature. The MAO charge was also reduced. This resulted in a lower Al loading (15%).

5.2b

The procedure was similar to Example 5-2a' but used a significantly lower MAO charge that resulted in a lower Al loading (11%).

Reaction of Oxygen Source Treated Carrier with Organoaluminum

The preparations below used a known amount of oxygen source (water) to treat calcined and non-calcined carriers (silica) to form the first product, which was then reacted with an organoaluminum compound (TMA).

5-3a.

10.4 g of silica (Grace 948 calcined at 200° C. for 4 hr), 65 g of toluene, and 0.88 g of water were charged to a 150 ml Schlenk flask under N$_2$ protection. The mixture was then placed on a shaker to shake for 16 hr. The mixture was brought into the drybox. 4.6 g of TMA and 50 g of toluene were charged to a 250 ml three-neck round bottom flask equipped with a mechanical stirrer. While agitating, the water saturated silica slurry was slowly added to the TMA solution using a wide-mouth pipette. The mixture was then allowed to stir at ambient conditions for 30 min, and was then heated to 100° C. in an oil-bath for 90 min. After cooling to ambient temperature, the mixture was filtered, washed two times with 20 g toluene and once with 30 g isohexane, and then dried under vacuum for 2 hr. Yield: 13.3 g (Al:10.9% from ICP).

5-3b.

10 g of raw silica (Grace 952 containing about 5% water) were charged into a 150 ml three-neck round bottom flask equipped with a mechanical stirrer. The flask was connected to a slow $N_2$ flow on the Schlenk line for 1 hr. A 150 ml Schlenk flask was charged with 60 g of mineral oil and 23 g of toluene and then connected to a Schlenk line to degas. The mixture of mineral oil and toluene was then transferred to the flask containing the raw silica through a cannula, and then the mixture was stirred under $N_2$ flow on the Schlenk line. 0.57 g of degassed water was then injected to the silica slurry. The mixture was stirred at ambient conditions for 30 min. Then the mixture was heated with a 70° C. oil-bath for 1 hr. The resulting material was stored at ambient conditions for overnight. The mixture was then transferred to a 150 ml dropping funnel equipped with slow $N_2$ flow protection. In the drybox, 5.2 g TMA and 60 g of toluene were charged to a 500 ml Schlenk flask with a stirbar. The TMA solution was taken out of the drybox and connected to the dropping funnel containing water saturated silica slurry under $N_2$ protection. The TMA solution was cooled with an ice-water bath. Then the silica slurry was slowly added to the TMA solution over 60 minutes while stirring. The ice-water bath was then removed, the agitation was stopped, and the mixture was warmed up to ambient temperature. The mixture was taken into the drybox and stored at ambient conditions for overnight. The stirbar was taken out and replaced with a mechanical stirrer. Then 0.52 g TMA was added. The mixture was then heated to 100° C. with an oil-bath for 3 hr. After cooling to about 70° C., the mixture was filtered, washed two times with 10 g toluene and two times with 15 g isohexane, then dried under vacuum for 2 hr. Yield: 12.5 g (Al:11.67% from ICP).

Example 6

Preparation of Composition of the Invention 6-1. Results Derived from Example 5-1 (Table 1, Entries 2 and 4)
6-1-M1 Catalyst This preparation used the supported MAO from Example 5-1 as the starting material. In the drybox, 1.0 g of MAO on silica made from Example 5-1 was charged into a 20 ml vial with 4 g of toluene. A toluene solution of $Me_2AlF$ (134 mg, 25.38%) was added all at once to the silica slurry. The $Me_2AlF$ charge was based on 17 mol % of Al on the silica. After shaking for 15 min., 11.0 mg M1 was added to the mixture, followed by shaking for 1 hr. The mixture was then filtered, washed two times with 3 g toluene and two times with 4 g isohexane, then dried under vacuum for 1 hr. Yield: 1.06 g (8% Al, 0.04% Zr based on the NMR quantitative analyses of the supernatant for $Me_2AlF$ and M1). The propylene polymerization results are listed in Table 1, Entry 2 with other catalyst data.

6-1-M4 Catalyst 19.6 mg M4 were added to the supported activator slurry obtained from a procedure similar to Example 6-1-M1, and the resulting mixture was shaken for 1 hr. The mixture was filtered, washed two times with 3 g toluene and two times with 4 g isohexane, then dried under vacuum for 1 hr. Yield: 1.24 g (8% Al, 0.4% Zr based on the NMR quantitative analyses of the supernatant for $Me_2AlF$ and M4). The ethylene polymerization results are listed in Table 1, Entry 4 with other catalyst data.

6-2a. Catalysts Derived from Example 5-2a (Table 1, Entries 6, 9, and 10)
6-2a-M1 Catalyst This preparation used the supported MAO of Example 5-2a as the starting material. In the drybox, 1.0 g of MAO on silica made from Example 5-2a was charged into a 20 ml vial with 3.5 g toluene. A toluene solution of $Me_2AlF$ (330 mg, 25.38%) was added all at once to the silica slurry. The $Me_2AlF$ charge was based on 17 mol % of Al on the silica. After shaking for 15 min., 11.0 mg M1 was then added to the mixture, followed by shaking for 1 hr. The mixture was filtered, washed two times with 3 g toluene and two times with 4 g isohexane, then dried under vacuum for 1 hr. Yield: 1.06 g (18% Al, 0.15% Zr from ICP). The polypropylene polymerization results are listed in Table 1, Entry 6 with other catalyst data.

6-2a-M5 Catalyst

The procedure was similar to 6-2a-M1 except that M5 was used as the metallocene. The resulting catalyst contained 18.47% Al and 0.17% Zr. The ethylene polymerization results and the catalyst data are listed in Table 1, Entry 9.

6-2a-M4dc Catalyst

The procedure was similar to 6-2a-M1 except that M4dc was used as the metallocene. The resulting catalyst contained about 18% Al (estimated based on 6-2a-M1 and 6-2a-M5) and about 0.40% Zr (estimated from the charge of M4dc). The ethylene polymerization results and the catalyst data are listed in Table 1, Entry 10.

6-2a'. Catalyst Derived from Example 5-2a' (Table 1, Entry 7)
6-2a'-M1dc Catalyst This preparation used the supported MAO of Example 5-2a' as the starting material. In the drybox, 3.0 g of MAO treated silica from Example 5-2a' was charged into a 20 ml vial with 8 g of toluene. A toluene solution of $Me_2AlF$ (0.97 g, 25.38%) was added all at once to the MAO treated silica slurry. The $Me_2AlF$ charge was based on 17 mol % of Al on the silica. The mixture was shaken for 15 min. Next, 27.4 mg M1dc were added, and the mixture was shaken for 2 hr and placed at ambient conditions for 1 hr. The mixture was filtered, washed two times with 8 g toluene and two times with 10 g isohexane, and then dried under vacuum for 2 hr, Yield: 3.08 g (Al:14.7%; Zr:0.15% from ICP). The propylene polymerization results along with the catalyst data are listed in Table 1, Entry 7.

6-2b. Catalysts Derived from Example 5-2b (Table 1, Entries 12 and 14)
6-2b-M6dc Catalyst This preparation used the supported MAO of Example 5-2b as the starting material. In the drybox, 1.0 g of MAO treated silica from Example 5-2b was charged into a 20 ml vial with 3 g of toluene. A toluene solution of $Me_2AlF$ (0.20 g, 25.38%) was added all at once to the MAO treated silica slurry. The $Me_2AlF$ charge was based on 17 mol % of Al on the silica. After shaking for 15 min., 45 mg of an M6dc toluene solution (24.6%) were added to the mixture, which was shaken for 2 hr and placed at ambient conditions for 1 hr. The mixture was filtered, washed two times with 2 g toluene and two times with 3 g isohexane, and dried under vacuum for 1 hr. Yield: 1.03 g (Al:11.09%; Zr:0.24% from ICP). The ethylene polymerization results along with the catalyst data are listed in Table 1, Entry 12.

6-2b-M1 Catalyst

The procedure was similar to 6-2b-M6dc Catalyst but M1 was used as the metallocene. The resulting catalyst contained 10.37% Al and 0.14% Zr from ICP. The propylene polymerization results and the catalyst data are listed in Table 1, Entry 14.

6-3a. Catalyst Derived from Example 5-3a (Table 1, Entry 17)
6-3a-M6 Catalyst

This preparation used the supported MAO of Example 5-3a as the starting material. In the drybox, 1.0 g of MAO treated silica from Example 5-2b was charged into a 20 ml vial with 4 g of toluene. A toluene solution of $Me_2AlF$ (0.27 g, 25.38%) was added all at once to the MAO treated silica slurry. The $Me_2AlF$ charge was based on 22 mol % of Al on the silica. After shaking for 20 min., an M6 toluene solution (19.6%) 73 mg was added to the mixture, which was shaken for 30 min, then placed at ambient conditions overnight. The mixture was filtered, washed two times with 2 g toluene and two times with 3 g isohexane, and dried under vacuum for 1 hr. Yield: 1.01 g (Al:12.33%; Zr:0.37% from ICP). The ethylene polymerization results along with the catalyst data are listed in Table 1, Entry 17.

6-3b. Catalysts Derived from Example 5-3b (Table 1, Entries 16 and 19)

6-3b-M6 Catalyst

This preparation used the supported MAO of Example 5-3b as the starting material. In the drybox, 1.0 g of MAO treated silica from Example 5-2b was charged into a 20 ml vial with 3 g of toluene. A toluene solution of $Me_2AlF$ (0.30 g, 25.38%) was added all at once to the MAO treated silica slurry. The $Me_2AlF$ charge was based on 22 mol % of Al on the silica. After shaking for 15 min., an M6 toluene solution (19.6%) 60 mg was added. The resulting mixture, which was shaken for 2 hr. The mixture was filtered, washed two times with 2 g toluene and two times with 3 g isohexane, and dried under vacuum for 1 hr. Yield: 0.99 g (Al:11.94%; Zr:0.31% from ICP). The ethylene polymerization results along with the catalyst data are listed in Table 1, Entry 16.

6-3b-M5 Catalyst

The procedure was similar to 6-3b-M6 Catalyst but M5 was used as the metallocene. The resulting catalyst contained 11.42% Al and 0.33% Zr from ICP. The ethylene polymerization results and the catalyst data are listed in Table 1, Entry 19.

Example 7

Comparative Examples

All examples in this section are from compositions derived from carriers and oxygenated organoaluminum compounds without treatment with a dialkylaluminum cation precursor agent.

Catalysts Derived from Example 5-1 (Table 1, Entries 1 and 3)

7-1-M1 Catalyst

The procedure was similar to 6-1-M1 Catalyst but without the $Me_2AlF$ treatment step. The resulting catalyst contained about 7% Al (estimated based on Example 6-1-M1) and about 0.40% Zr (estimated based on the metallocene charge and the supernatant analysis). The propylene polymerization results and the catalyst data are listed in Table 1, Entry 1.

7-1-M4 Catalyst

The procedure was similar to 6-1-M4 Catalyst but without the $Me_2AlF$ treatment step. The resulting catalyst contained about 7% Al (estimated based on Example 6-1-M4) and about 0.40% Zr (estimated based on the metallocene charge and the supernatant analysis). The ethylene polymerization results and the catalyst data are listed in Table 1, Entry 3.

7-2a. Catalysts Derived from Example 5-1 (Table 1, Entries 5 and 8)

7-2a-M1 Catalyst

The procedure was similar to 6-2a-M1 Catalyst but without the $Me_2AlF$ treatment step. The resulting catalyst contained 17.3% Al and 0.17% Zr from ICP. The propylene polymerization results and the catalyst data are listed in Table 1, Entry 5.

7-2a-M5 Catalyst

The procedure was similar to 6-2a-M5 Catalyst but without the $Me_2AlF$ treatment step. The resulting catalyst contained about 18% Al (estimated based on Example 6-2a-M5) and about 0.40% Zr (estimated based on the metallocene charge and the supernatant analysis). The ethylene polymerization results and the catalyst data are listed in Table 1, Entry 8.

7-2b. Catalyst Derived from Example 5-2b (Table 1, Entry 13)

7-2b-M1 Catalyst

The procedure was similar to 6-2b-M1 Catalyst but without the $Me_2AlF$ treatment step. The resulting catalyst contained 10.1% Al and 0.25% Zr from ICP. The propylene polymerization results and the catalyst data are listed in Table 1, Entry 13.

7-3b. Catalysts Derived from Example 5-3b (Table 1, Entries 11, 15, and 18)

7-3b-M6 Catalyst

The procedure was similar to 6-3b-M6 Catalyst but without the $Me_2AlF$ treatment step. The resulting catalyst contained 11.53% Al and 0.288% Zr from ICP. The ethylene polymerization results and the catalyst data are listed in Table 1, Entries 11 and 15 (The same results are listed twice just for comparison purpose).

7-3b-M5 Catalyst

The procedure was similar to 6-3b-M5 Catalyst but without the $Me_2AlF$ treatment step. The resulting catalyst contained 11.87% Al and 0.40% Zr from ICP. The ethylene polymerization results and the catalyst data are listed in Table 1, Entry 18.

Example 8

Polymerization Procedures 8.1 Polymerization Procedures for Polypropylene

Polymerization conditions: A 4 L reactor was dried by heating at 10° C. for 15 minutes minimum under low-pressure nitrogen flow. After cooling to ambient, the reactor was charged with 2200 ml of propylene. Hydrogen was then added by measuring a 180 psi pressure drop from a 50 ml bomb. 2 ml of 10% TIBA in hexane was added to the reactor as a scavenger and the mixture was stirred for 5 minutes. The reactor agitator was set at 800 rpm. Then, 20-50 mg of supported catalyst slurried in 2 ml of hexane was injected into the reactor. The reaction was heated to 70° C. and the polymerization was carried out for 1 hour at 70° C. The reaction was stopped by venting off the propylene. The polymer was isolated, dried, and weighed. The polymerization productivity was calculated.

8.2 Polymerization Procedures for Polyethylene

Polymerization conditions for M4 and M5 metallocenes: A 4 L reactor was dried by heating at 100° C. for 15 minutes under low-pressure nitrogen flow. After cooling to ambient, the reactor was pressurized with isobutane and vented three times to remove nitrogen. Isobutane (1800 ml) was charged into the reactor while adding 40 ml of dried 1-hexene and 2 ml of 10% TIBA scavenger. The reactor agitator was set at 800 rpm. After flushing the charging line with 200 ml of isobutane, the reactor was charged with ethylene up to 320 psi while at the same time bringing the temperature of the reactor up to 80° C. Then, 30-100 mg of solid catalyst was slurried in 2 ml of hexane in the glovebox and then injected into the reactor. The reaction pressure was maintained at 320 psi and the polymerization was carried out for 1 hour at 80° C. The reaction was stopped by venting off the ethylene and isobutane. The polymer was isolated, dried, and weighed. The polymerization productivity and activity of each catalyst were calculated.

Polymerization procedure for M6 metallocene: The procedure was identical to the M4 and M5 metallocenes except a 120 ml 1-hexene charge and a temperature of 85 C were used.

TABLE 1

Final Catalyst Data and Polymerization Results

| Entry | Example ID | Carrier Source | Me$_2$AlF (mol %)[1] | Metallocene | Al % | Zr % | Productivity (g/g cat/hr) | Activity (Kg/g Zr/hr) |
|---|---|---|---|---|---|---|---|---|
| 1 | 7-1-M1 | 5-1 | 0 | M1 | 7 | 0.40 | <200 | <50 |
| 2 | 6-1-M1 | 5-1 | 17 | M1 | 8 | 0.04 | 8,000 | 20,000 |
| 3 | 7-1-M4 | 5-1 | 0 | M4 | 7 | 0.40 | <200 | <50 |
| 4 | 6-1-M4 | 5-1 | 17 | M4 | 8 | 0.40 | 5,300 | 1,330 |
| 5 | 7-2a-M1 | 5-2a | 0 | M1 | 17 | 0.17 | 10,000 | 5,880 |
| 6 | 6-2a-M1 | 5-2a | 17 | M1 | 18 | 0.15 | 26,500 | 17,670 |
| 7 | 6-2a'-M1dc | 5-2a' | 17 | M1dc | 15 | 0.15 | 19,200 | 12,800 |
| 8 | 7-2a-M5 | 5-2a | 0 | M5 | 17 | 0.38 | 9,000 | 2,370 |
| 9 | 6-2a-M5 | 5-2a | 17 | M5 | 18 | 0.17 | 10,300 | 6,060 |
| 10 | 6-2a-M4dc | 5-2a | 17 | M4dc | 18 | 0.40 | 18,400 | 4,600 |
| 11 | 7-3b-M6 | 5-3b | 0 | M6 | 12 | 0.29 | 1,100 | 380 |
| 12 | 6-2b-M6dc | 5-2b | 17 | M6dc | 11 | 0.24 | 3,300 | 1,380 |
| 13 | 7-2b-M1 | 5-2b | 0 | M1 | 10 | 0.25 | 2,800 | 1,120 |
| 14 | 6-2b-M1 | 5-2b | 17 | M1 | 10 | 0.14 | 9,500 | 6,790 |
| 15 | 7-3b-M6 | 5-3b | 0 | M6 | 12 | 0.29 | 1,100 | 370 |
| 16 | 6-3b-M6 | 5-3b | 22 | M6 | 12 | 0.31 | 4,960 | 1,600 |
| 17 | 6-3a-M6 | 5-3a | 22 | M6 | 12 | 0.37 | 3,600 | 970 |
| 18 | 7-3b-M5 | 5-3b | 0 | M5 | 12 | 0.40 | 3,500 | 880 |
| 19 | 6-3b-M5 | 5-3b | 22 | M5 | 11 | 0.33 | 5,000 | 1,600 |

[1]mol % is based on Al loading on silica supported MAO

While the present invention has been described in terms of one or more preferred embodiments, it is to be understood that other modifications may be made without departing from the scope of the invention, which is set forth in the claims below.

The invention claimed is:

1. A composition derived from at least:
   a) an intermediate composition derived from at least an organoaluminum compound, a carrier, and an oxygen source; and
   b) R$^2{}_2$AlY, wherein each R$^2$ independently comprises a hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical.

2. The composition of claim 1, wherein the carrier comprises an inorganic oxide.

3. The composition of claim 2 wherein the inorganic oxide comprises silica, alumina, silica-alumina, magnesia, titania, zirconia, or clays.

4. The composition of claim 2 wherein the inorganic oxide comprises silica.

5. The composition of claim 1 wherein the organoaluminum compound comprises trimethyl aluminum, tri ethyl aluminum, or triisobutylaluminum.

6. The composition of claim 1 wherein the R$^2{}_2$AlY comprises dimethylaluminum halide.

7. The composition of claim 1 wherein the R$^2{}_2$AlY comprises dialkylaluminum fluoride.

8. The composition of claim 1 wherein the R$^2{}_2$AlY comprises dimethylaluminum fluoride.

9. The composition of claim 1, wherein the composition is further derived from a Lewis base.

10. A catalyst composition for olefin polymerization, wherein the catalyst composition is prepared by combining at least a composition according to claim 1 and a transition metal component.

11. A composition derived from at least:
   a) an intermediate composition derived from at least a carrier and an oxygenated organoaluminum compound; and
   b) R$^2{}_2$AlY, wherein each R$^2$ independently comprises a hydrocarbyl group having from 1 to about 20 carbon atoms, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical.

12. A composition derived from at least:
   a) an intermediate composition derived from at least a carrier and an oxygenated organoaluminum compound;
   b) R$^2{}_2$AlY, wherein each R$^2$ independently comprises a hydrocarbyl group having from 1 to about 20 carbon atoms, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical; and
   c) a Lewis base.

13. A catalyst composition for olefin polymerization, wherein the catalyst composition is prepared by combining at least a composition according to claim 11 and a transition metal component.

14. A method of preparing a composition comprising:
   a) combining at least an organoaluminum compound, a carrier, and an oxygen source to form an intermediate composition; and b) combining at least a portion of the intermediate composition with $R^2{}_2AlY$, wherein each $R^2$ independently comprises a hydrocarbyl group having from 1 to about 20 carbons, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical.

15. A method of preparing a composition comprising combining at least:
   a) an intermediate composition derived from at least a carrier and an oxygenated organoaluminum compound; and
   b) $R^2{}_2AlY$, wherein each $R^2$ independently comprises hydrocarbyl group having from 1 to about 20 carbon atoms, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical.

16. A method of preparing a composition comprising combining at least:
   a) an intermediate composition derived from at least a carrier and an oxygenated organoaluminum compound;
   b) $R^2{}_2AlY$, wherein each $R^2$ independently comprises hydrocarbyl group having from 1 to about 20 carbon atoms, and Y comprises a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical; and
   c) Lewis base.

17. A method of polymerizing monomer comprising combining a composition according to claim 1, a transition metal component, and monomer.

18. A composition derived from at least:
   a) an intermediate composition derived from at least an organoaluminum compound and an oxygen source; and
   b) $R^2{}_2AlY$, wherein each $R^2$ independently comprises hydrocarbyl group having from 1 to about 20 carbons, and Y consists essentially of an alkoxide radical, an aryloxide radical, an alkyl substituted amide radical, an aryl substituted amide radical, a siloxy radical, a boronoxy radical, or a diaryl boronoxy radical.

19. A composition derived from at least:
   a) an intermediate composition derived from at least an organoaluminum compound and an oxygen source;
   b) $R^2{}_2AlY$, wherein each $R^2$ independently comprises hydrocarbyl group having from 1 to about 20 carbons, and Y consists essentially of an alkoxide radical, an aryloxide radical, an alkyl substituted amide radical, an aryl substituted amide radical, a siloxy radical, a boronoxy radical, or a diaryl boronoxy radical; and
   c) a Lewis base.

20. A catalyst composition for olefin polymerization, wherein the catalyst composition is prepared by combining at least a composition according to claim 18 and a transition metal component.

21. A method of polymerizing monomer comprising combining a composition according to claim 18, a transition metal component, and monomer.

22. A composition according to claim 1 having one of the following structures:

Formula I

Formula II

Formula III

Formula IV wherein ∼∼∼ is a bulk aluminoxane (AO) structure, each $R^B$, $R^P$, and $R^2$ is independently a hydrocarbyl group having up to about 20 carbon atoms, and each Y is independently a halide radical, a pseudo halide radical, an alkoxide radical, an aryloxide radical, an alkyl substituted amide radical, an aryl substituted amide radical, a siloxy radical, a boronoxy radical, a diaryl boronoxy radical, or a halogenated diaryl boronoxy radical;
   and a carrier, wherein said carrier is attached to said bulk aluminoxane structure.

23. The composition of claim 22, wherein each $R^B$, $R^P$, and $R^2$ is methyl or iso-butyl.

24. The composition of claim 23, wherein Y is halide radical, alkoxide radical or aryloxide radical.

25. The composition of claim 24, wherein Y is methoxide radical, ethoxide radical, isobutoxide radical, tert-butoxide radical, phenoxide radical, 2,6-di-tert-butyl-4-methyl-phenoxide radical, pentafluorophenoxide radical or fluoride.

26. The composition of claim 22, wherein the composition has the structure of Formula I or Formula II.

27. The composition of claim 26, wherein each $R^B$, $R^P$, and $R^2$ is methyl or iso-butyl and Y is a methoxide radical, tert-butoxide radical, phenoxide radical or pentafluorophenoxide radical, or fluoride.

28. A composition comprising the composition of claim 22, and a transition metal component.

29. The composition of claim 22, wherein said carrier is silica.

30. The composition of claim 22, wherein the mole ratio of Y to the aluminum in the bulk aluminoxane structure is about 1:30 to about 8:25.

31. The composition of claim 22, wherein each Y is independently an alkoxide radical, an aryloxide radical, an alkyl substituted amide radical, an aryl substituted amide radical, a siloxy radical, a boronoxy radical or a diaryl boronoxy radical.

* * * * *